I. ARCOS.
Scrapers.
No. 152,060. Patented June 16, 1874.
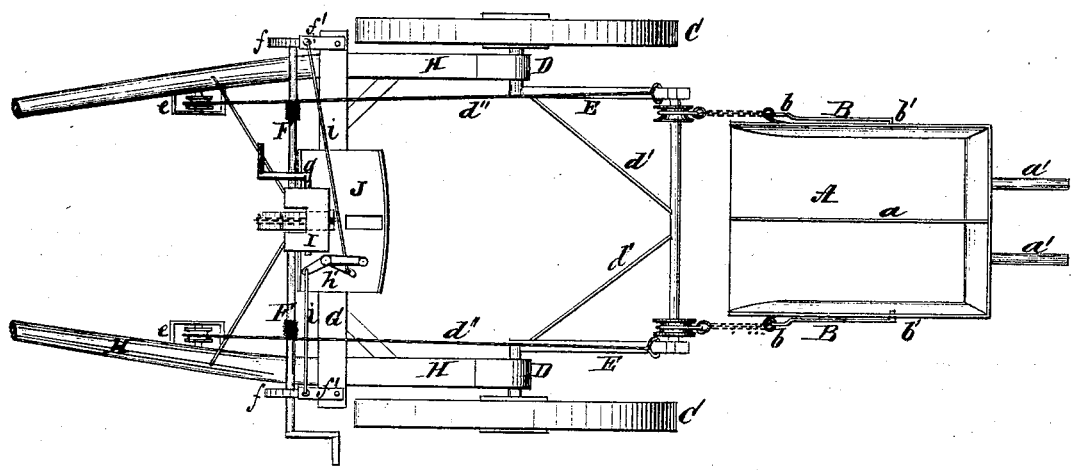
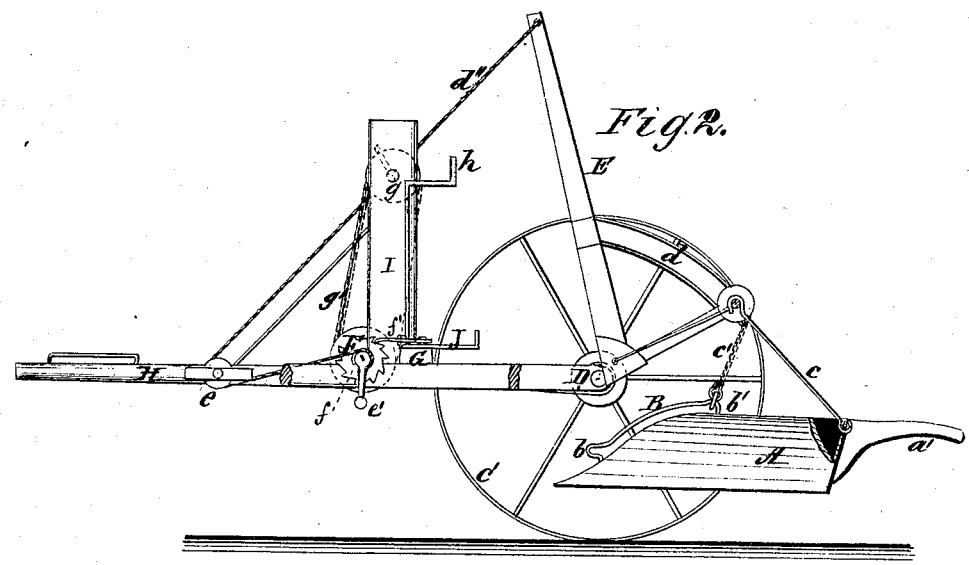
WITNESSES:
G. Mathys
Golon C. Kemon
INVENTOR:
Ignacio Arcos
BY
ATTORNEYS.

UNITED STATES PATENT OFFICE

IGNACIO ARCOS, OF SAN ANTONIO, TEXAS.

IMPROVEMENT IN SCRAPERS.

Specification forming part of Letters Patent No. 152,060, dated June 16, 1874; application filed May 15, 1874.

*To all whom it may concern:*

Be it known that I, IGNACIO ARCOS, of San Antonio, Bexar county, State of Texas, have invented a new and useful Improvement in Excavators; and I do hereby declare that the following is a full, clear, and exact description of the same, reference being had to the accompanying drawing forming a part of this specification, in which—

Figure 1 is a plan view of excavator; Fig. 2, a vertical side elevation.

This invention relates to that class of excavators in which a large heavy scoop is attached to a gearing of wheels to be drawn by horses. Its object is to facilitate the process of digging or filling up ditches, leveling roads or fields, grading of railroads, &c.; and it consists of a heavy scoop having a rod running along the upper edges of its sides, with loops in both ends to form an adjustable support. To the rings in these rods are attached the chains that support the scoop, the other ends of which are attached to the elevated horizontal part of the crank-axle. To the vertical parts of the crank-axle are attached the lever-arms, which may be raised or lowered by ropes attached to their ends, passing around pulleys or sheaves in the shafts, and wound around a windlass having a ratchet-wheel and pawl, by means of which arrangement the scoop may be raised or lowered.

In the drawing, A represents the scoop, having partition or brace $a$, rods B, with loops $b$ $b'$, handles $a'$, adjustable link $c$, and chains $c'$. C represents the wheels that revolve upon the axle D, and E the lever-arms that are attached to the crank-axle by braces $d$ $d'$. To the ends of these arms are attached the ropes $d''$, which pass around the sheaves $e$, and are wound around the windlass F by the crank $e'$, the ratchet-wheels $f$ and pawls $f'$ serving to keep the arms E in place. Upon a cross-bar, G, that is placed across the shafts H, is erected a vertical frame-work, I, in the top of which is the pulley and crank $g$, connecting with the pulley on the windlass F by a chain or cord, $g'$, by means of which arrangement the scoop may be raised or lowered by the driver, who is supposed to stand on the platform J. To the frame I is adjusted another crank, $h$, having a bell-crank, $h'$, below, connected with the pawls $f'$ by rods $i$.

To operate this scoop, unwind the windlass and allow the scoop to fall upon the ground by letting the arms E go back. Now place the rings of the chain $c'$ in the front loop $b$ of rods B, and, by elevating the handles $a'$ of scoop and driving forward the machine, the scoop is filled. Now back the wheels, and place the rings of chain $c'$ in loops $b'$. Then attach the adjustable link $c$, one end to the back of the scoop and the other to the crank-axle, and wind up the windlass, which, by drawing down the arms E, brings the scoop in a suspended position directly beneath the axle, ready for transportation.

Having thus described my invention, what I claim as new is—

1. The rods B, with loops $b$ $b'$, brace $a$, and adjustable link $c$, in combination with scoop A and handles $a'$, as and for the purpose described.

2. The lever-arms E, as attached by braces $d$ $d'$ to crank-axle D, in combination with ropes $d''$, sheaves $e$, windlass F, crank $e'$, ratchets $f$, and pawls $f'$, as and for the purpose specified.

3. The frame I, with crank and pulley $g$ and chain $g'$, in combination with the windlass F, rods $i$, bell-crank $h'$, shaft and crank $h$, and platform J, as and for the purpose described.

4. The rods B, with loops $b$ $b'$, brace $a$, and adjustable link $c$, in combination with chains $c'$, crank-axle D, braces $d$ $d'$, and lever-arms E, as and for the purpose specified.

IGNACIO ARCOS.

Witnesses:
  CARL FRANK,
  HENRY ILMENDORF.